Jan. 27, 1970     C. E. WATSON     3,491,520
LIMB SHAKER
Filed July 10, 1967
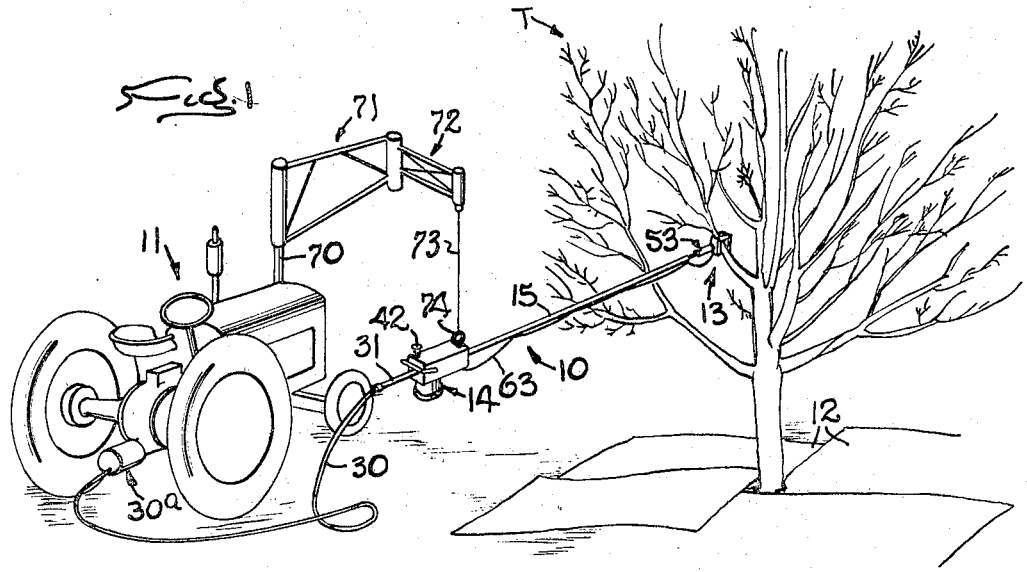
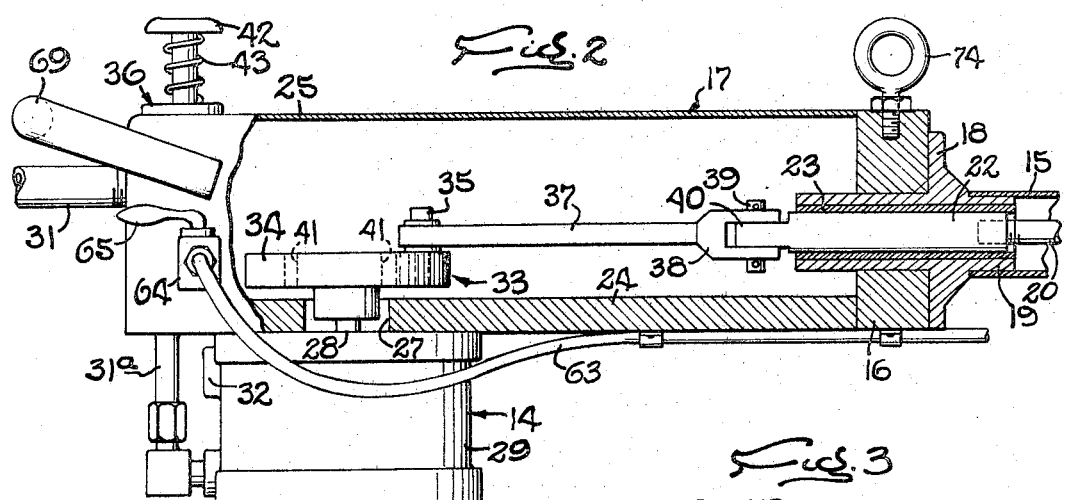
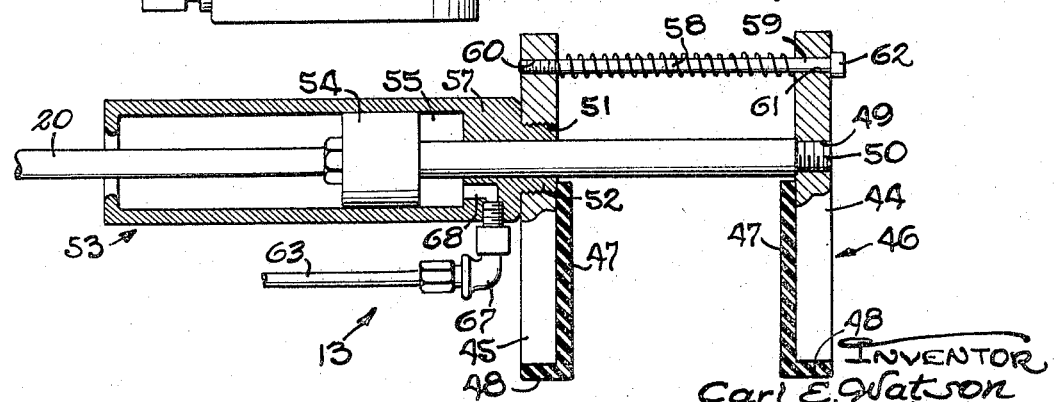
INVENTOR
Carl E. Watson
ATTORNEYS

United States Patent Office 3,491,520
Patented Jan. 27, 1970

3,491,520
LIMB SHAKER
Carl E. Watson, Beloit, Wis., assignor to
Elmer V. Mrozek, Waukesha, Wis.
Continuation-in-part of application Ser. No. 548,762,
May 9, 1966. This application July 10, 1967, Ser.
No. 652,338
Int. Cl. A01g *19/00;* B23q *3/08*
U.S. Cl. 56—328                    2 Claims

ABSTRACT OF THE DISCLOSURE

A portable shaker for gripping and shaking the limbs of fruit and nut trees and having a hollow boom projecting outwardly from a housing that supports a pneumatic motor. The motor is connected by an adjustable crank to a shaker rod telescoped through the boom and carrying a pneumatically operated clamping mechanism on its outer end, and is driven by compressed air admitted through a manually adjustable valve. The clamping mechanism includes a fixed jaw and a movable jaw on the shaker rod and a cylinder connected to the movable jaw and slidable relative to a fixed piston on the rod in response to the admission of compressed air into one end of the cylinder from a second valve carried on the housing.

BACKGROUND OF THE INVENTION

This is a continuation-in-part of my copending application, Ser. No. 548,762, filed May 9, 1966 and now abandoned, and relates to a limb shaker for shaking the limbs of fruit and nut trees in order to harvest the crop thereon in a rapid and efficient manner. The majority of shakers presently available are designed primarily for use in large orchards and, as a result, are elaborate machines which are extremely expensive and not within economic reach of a grower cultivating a relatively small grove of trees. While smaller and less costly shakers have been proposed, they generally are unsatisfactory in that they cannot be adapted for various crop conditions and thus often result in either an incomplete harvest or in severe damage to the trees.

SUMMARY OF THE INVENTION

The general object of the present invention is to provide a new and improved limb shaker which is relatively inexpensive, compact, and light in weight and, at the same time, is capable of adjustment so that different kinds of crops having varying degrees of ripeness may be harvested efficiently and without damage to the trees. Related objects are to achieve the foregoing with an extremely simple construction comprising a shaking unit reciprocated by a pneumatically operated motor, both the stroke of the unit and the speed of the motor being adjustable to apply the proper vibratory force to the trees in accordance with the nature of the trees and the condition of the crop; to provide a novel and inexpensive means for mounting the shaker on a vehicle, these means enabling the shaker to reach substantially all of the branches while preventing transmission of the shaker vibrations to the vehicle; and to incorporate in the shaker an improved and easily operated clamp for gripping limbs firmly but without danger of damage to the bark.

Other objects and advantages of the invention will become apparent from the following detailed description taken in connection with the accompanying drawings.

BRIEF DESCRIPTION OF THE DRAWINGS

FIGURE 1 is a perspective view of a limb shaker embodying the novel features of the present invention and illustrated as mounted on a vehicle and in operative engagement with a tree.

FIG. 2 is an enlarged fragmentary side elevation of the limb shaker shown in FIG. 1 with parts broken away and shown in section.

FIG. 3 is an enlarged fragmentary side elevation of the clamping mechanism of the limb shaker shown in FIG. 1 with parts broken away and shown in section.

DESCRIPTION OF THE PREFERRED EMBODIMENT

As shown in the drawings for purposes of illustration, the invention is embodied in a limb shaker 10 adapted to be either carried by hand or mounted on a vehicle such as a tractor 11 and operable to shake the limbs of a tree T bearing fruit or nuts so that the latter will be loosened from the limbs and will fall to the ground for subsequent collection. To aid in collecting the crop shaken from the tree, a series of sheet-like aprons 12 may be placed beneath the branches to catch the crop as it falls to the ground, the aprons later being picked up and the crop thereon dumped into receptacles.

The present invention contemplates a new and improved limb shaker 10 which not only is effective to harvest crops of various degrees of ripeness and from different kinds of trees without damaging the latter, but which also is more compact, lighter in weight, and capable of being manufactured at lower cost than prior shakers adapted for use under widely varying conditions. To these ends, each individual element making up the shaker has been contrived with cost and weight as primary considerations and yet the coaction existing between these elements is such that the shaker is especially suitable for use in all types of orchards. In particular, these purposes are achieved with an extremely simple construction, comprising a clamp mechanism 13 engageable with the tree T and reciprocated by a pneumatically operated motor 14, both the stroke of the unit and the speed of the motor being adjustable so that the amplitude and frequency of the shaking force may be correlated with the condition of the crop being harvested. To avoid damage to trees during shaking, an improved and easily actuated clamp mechanism is incorporated in the shaker to grip tree limbs firmly without danger of damage to the bark.

In this instance, the shaker 10 comprises a tubular boom 15 made of light weight material such as aluminum and of such length as to reach the innermost limbs of the tree T. At its lower or inner end, the boom is joined rigidly to the end wall 16 of an enclosed housing 17 by means of a flanged plate 18 formed witth a cylindrical nipple 19 disposed coaxially within the boom. An elongated shaking rod 20 (FIG. 3) extends upwardly and outwardly through the boom and is slidably guided in bushings (not shown) therein at longitudinally spaced points along the boom. As shown in FIG. 2, the inner end of the shaking rod 20 is threaded into a cylindrical bar 22 journaled for axial sliding in a bushing 23 extending through the end wall 16 of the housing 17 and projecting into the nipple 19 of the flanged plate 18.

In addition to the end wall 16, the housing 17 comprises a bottom supporting plate 24 joined at its forward margin to the end wall. Completing the housing is a sheet metal cover 25 secured to the side edges of the supporting plate and to the top edge of the end wall by removable fasteners (not shown). Projecting through a hole 27 in the bottom of the plate 24 is the drive shaft 28 of the pneumatic motor 14. This motor preferably is of the rotary vane type and includes a bladed rotor (not shown) operatively connected to the drive shaft and surrounded by a casing 29, the latter being bolted to the plate 24 to fasten the motor to the housing 17. Air under pressure for driving the motor flows through a fluid hose 30 (FIG. 1) connected to a compressor and tank 30ª on the tractor 11 or other motor-operated portable unit and is admitted into the casing through an inlet pipe 31 and an extension 31ª leading to the motor inlet. An outlet port is formed at 32 in the motor casing below the inlet pipe 31 and opens to the atmosphere to exhaust air from the casing.

To convert the rotary motion of the motor 14 into back and forth motion for reciprocating the shaker rod 20 and for shaking the tree T, a crank 33 is disposed within the housing 17 and is connected to the cylindrical bar 22 and thus to the shaker rod. Herein the crank comprises a circular disk 34 keyed to the drive shaft 28 of the motor and eccentrically mounting an upright pin 35. Pivotally connected to the pin is one end of a pitman 37 formed at its opposite end with a fork 38 which is pivotally connected by a pin 39 to a tongue 40 integral with the inner end of the bar 22. Thus, the motor acts through the crank disk and the pitman to reciprocate the shaker rod within the boom 15.

When harvesting fruit such as ripe cherries, it is necessary only to vibrate the tree with a relatively small force in order to shake the fruit from the limbs. On the other hand, when harvesting relatively green fruit and certain types of nuts, a larger shaking force is required to insure a complete harvest. To enable the limb shaker to harvest all types of crops in an efficient manner while apply no more force than necessary to the tree, provision is made for varying the amplitude of the stroke of the shaking rod 20. For this purpose, the crank pin 35 is adapted to be secured to the disk 34 at various radial distances from the axis of the shaft 28 to vary the throw of the crank 33 and the length of the stroke of the rod 20. Herein, a plurality of spaced threaded holes 41 (FIG. 2) are formed in the disk so that the throw of the crank may be changed merely by threading the pin 35 into a selected one of the holes. Preferably, the holes are spaced so that the length of the stroke can be set at 1½, 2 or 2½ inches, these representative values being suitable for harvesting most fruits and nuts.

To control the operation of the motor 14, a valve 36 is interposed between the supply pipe 31 and the branch or extension line 31ª and is operated by a plunger 42 mounted on top of the housing 17 adjacent the outer end thereof and urged upwardly out of the housing toward a closed position by a compression spring 43 coiled around the stem of the plunger. When the plunger is depressed, the valve is opened to admit air to the motor inlet, and varying degrees of opening of the valve will vary the motor speed and, therefore, the frequency of vibration of the shaker rod 20. In most instances, full or maximum frequency such as 900–1100 cycles per minute will be used, but it is possible to reduce this for a gentler shaking action as required for a particular situation. Accordingly, both frequency and amplitude of the vibratory force may be adjusted for optimum shaking action, and no greater shaking force need be applied than is necessary for effective fruit removal.

The improved clamping mechanism 13, shown most clearly in FIG. 3, comprises a pair of jaws in the form of generally rectangular plates 44 and 45 mounted in spaced parallel relation on the outer end of the shaker rod 20 and cooperating with the rod to form a generally U-shaped tree-engaging hook 46. Covering the adjacent faces of the plates are pads 47 composed of relatively firm yieldable rubber and preferably cemented to the plates. Herein, the pads also have flanges 48 covering the lower edges of the plates.

The outer jaw plate 44 is formed with a threaded hole 49 offset upwardly (FIG. 3) from the vertical center of the plate and receiving the threaded outer end 50 of the rod. The inner plate 45 is formed with a larger threaded hole 51 in which a bushing 52 is mounted, and the bushing telescopes slidably with the shaker rod so that the inner jaw plate is movable along the rod, sliding toward and away from the outer plate to clamp and release a limb.

To operate the clamp, a pneumatic cylinder 53 is telescoped over the shaker rod 20 and attached to the movable jaw plate 45, and a piston 54 is fastened to the rod inside the cylinder so that pressurized air admitted into the chamber 55 between the piston and the outer end wall 57 of the cylinder shifts the latter and the movable plate outwardly along the shaker rod. Herein, the cylinder and the bushing 52 are formed integrally with each other to effect the connection between the cylinder and the movable plate, and the jaw plates are urged yieldably away from each other by a coiled compression spring 58 telescoped over a guide pin 59 threaded at 60 into the upper portion of the movable plate and passing loosely through a hole 61 in the upper portion of the outer plate. A head 62 on the rod limits separation of the jaw plates.

Compressed air from the source 30ª is delivered to the cylinder 53 through a flexible hose 63 connected at one end (FIG. 2) to a valve 64 connected into the supply pipe 31 ahead of the valve 36, the valve 64 having a rotary operating handle 65 movable between open and closed positions. The hose extends along the boom 15 to the cylinder and opens into the chamber 55 through a fitting 67 (FIG. 3) and a passage 68. Thus, when the valve 64 is opened, air is admitted into the cylinder to shift the clamp jaws into gripping engagement with a tree limb between the jaws preparatory to vibrating the limb.

While the limb shaker 10 described above will weigh only between 20 and 30 lbs. depending on the size of the various elements, and thus can be carried easily by the machine operator by cradling the boom 13 in one arm and gripping a handle 69 on the housing, the shaker also may be mounted on the tractor 11 as shown in FIG. 1, novel mounting means being provided to enable the hook 46 to reach the various limbs of the tree and, at the same time, prevent the vibratory forces of the shaker from being transmitted to the tractor. In addition, these means are constructed in accordance with the basic scheme of the invention to perform the essential functions mentioned above while maintaining the cost of the shaker within reach of the smaller growers.

Herein, the mounting means comprise a post 70 upstanding from the tractor and rotatably mounting a horizontal arm 71 on its upper end. A second arm 72 is journaled for rotation on the free end of the first arm and carries a depending cable 73 at its outer end. The shaker 10 is suspended from the cable for universal swinging by means of an eye bolt 74 (FIGS. 1 and 2) threaded into the end wall 16 of the housing 17 and secured to the cable. By grasping the handle 69 on the housing 17, the operator may maneuver the clamping mechanism 13 into position to engage almost any limb due to the double-articulated connection between the arms 71 and 72 and the post 70 and due to the flexibility of the cable 73. Moreover, the cable absorbs the reaction forces produced by the shaker so that very little, if any, vibration is transmitted to the tractor. It should be noted, however, that the crank mechanism 33 produces a surprisingly small amount of vibration.

From the foregoing, it will be apparent that the new and improved limb shaker 10 possesses most of the advantages of the heavier and more elaborate shakers and yet is extremely simple in construction and considerably less expensive. By using a pneumatic motor 14 to provide the shaking force, complex valving is avoided and the maneuverability of the shaker is hindered by only a single fluid hose, which also supplies the pressure for actuating the clamping mechanism.

I claim as my invention:

1. In a vehicle-mounted limb shaker for harvesting fruits, nuts and the like, the combination of, a supporting post secured to and projecting upwardly from the vehicle, a first horizontal arm journaled for swinging movement on said post, a second horizontal arm journaled for swinging movement on said first arm about a vertical axis spaced radially from said post, a flexible element depending from the free end of said second arm, an enclosed housing fastened to the lower end of said element and suspended from said second arm for universal swinging, an air supply element on said housing, an elongated boom carried by and projecting outwardly from one end of said housing, a reciprocating shaking unit including a shaker rod slidably telescoped within said boom and having a hook fast on its outer end, said hook being defined by a pair of spaced jaws for gripping a tree to be shaken, an air cylinder telescoped onto the outer end portion of said shaker rod and connected to one of said jaws, said one jaw being movable along said rod toward and away from the other jaw, a piston fast on said rod within said cylinder, a first selectively operable valve on said housing for admitting air under pressure from said element into said cylinder to shift said one jaw toward said other jaw, a pneumatically operated motor having a rotatable drive shaft within said housing, a crank including a rotary disk fast on said shaft and having a plurality of threaded holes spaced at various radial distances from the shaft, a pin threaded into a selected one of said holes and connected to the inner end of said shaker rod whereby rotation of said shaft reciprocates the rod to vibrate a tree engaged by said hook, and a second valve carried by said housing and selectively operable to admit air from said element to said motor at an adjustable rate whereby the frequency of vibration may be varied by manipulating the valve to change the speed of the motor.

2. In a limb shaker for harvesting fruit, nuts and the like, the combination of, an enclosed manually manipulable housing, an air supply element on said housing, an elongated boom carried by and projecting outwardly from one end of said housing, a reciprocating shaking unit including a shaker rod slidably telescoped within said boom and having a hook fast on its outer end, said hook being defined by a pair of spaced jaws for gripping a tree to be shaken, an air cylinder telescoped onto the outer end portion of said shaker rod and connected to one of said jaws, said one jaw being movable along said rod toward and away from the other jaw, a piston fast on said rod within said cylinder, a first selectively operable valve on said housing for admitting air under pressure from said element into said cylinder to shift said one jaw toward said other jaw, spring means mounted between the jaws and acting to bias said jaws away from each other, a pneumatically operated motor having a rotatable drive shaft disposed within said housing, a crank including a rotary disc fast on said shaft and having a plurality of holes spaced at various radial distances from the shaft, a pin inserted into a selected one of said holes and connected to the inner end of said shaker rod whereby rotation of said shaft reciprocates the rod to vibrate a tree engaged by said hook, and a second valve carried by said housing and selectively operable to admit air from said element to said motor at an adjustable rate whereby the frequency of vibration may be varied by manipulating the valve to change the speed of the motor.

References Cited

UNITED STATES PATENTS

| 1,472,262 | 10/1923 | Abildgaard | 56—328 |
| 2,223,915 | 12/1940 | Lambert | 269—25 |
| 2,444,304 | 6/1948 | Miller | 269—25 |
| 2,683,386 | 7/1954 | Doebeli | 269—35 X |
| 3,013,374 | 12/1961 | Balsbaugh | 56—328 |
| 3,041,811 | 7/1962 | Sides | 56—328 |
| 2,685,775 | 8/1954 | Gould et al. | 56—328 |
| 2,804,743 | 9/1957 | Gould et al. | 56—328 |
| 3,120,091 | 2/1964 | Gould et al. | 56—328 |

ROBERT PESHOCK, Primary Examiner

PASQUALE A. RAZZANO, Assistant Examiner

U.S. Cl. X.R.

269—25, 35; 294—103